(12) United States Patent
Turner (10) Patent No.: US 8,301,897 B2
(45) Date of Patent: Oct. 30, 2012

(54) CHALLENGE-BASED AUTHENTICATION PROTOCOL

(75) Inventor: Bryan C. Turner, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1715 days.

(21) Appl. No.: 11/466,685

(22) Filed: Aug. 23, 2006

(65) Prior Publication Data

US 2008/0072056 A1   Mar. 20, 2008

(51) Int. Cl.
*G06F 21/00*   (2006.01)

(52) U.S. Cl. ........ 713/182; 713/184; 713/159; 713/165; 726/2; 726/65; 726/6; 726/18; 380/30; 380/56; 380/255; 715/741; 715/742; 715/743; 709/229

(58) Field of Classification Search .......... 713/180–184, 713/156, 171; 726/6–28; 380/30, 56, 255; 715/741–743
See application file for complete search history.

(56) References Cited

U.S. PATENT DOCUMENTS

| | | | | |
|---|---|---|---|---|
| 5,559,961 | A * | 9/1996 | Blonder | 726/18 |
| 5,608,387 | A * | 3/1997 | Davies | 340/5.27 |
| 7,076,730 | B1 * | 7/2006 | Baker | 715/210 |
| 7,114,074 | B2 * | 9/2006 | Alasia et al. | 713/176 |
| 7,139,917 | B2 * | 11/2006 | Jablon | 713/183 |
| 7,143,440 | B2 * | 11/2006 | Ginzberg | 726/18 |
| 7,149,801 | B2 * | 12/2006 | Burrows et al. | 709/225 |
| 7,197,639 | B1 * | 3/2007 | Juels et al. | 713/168 |
| 7,272,380 | B2 * | 9/2007 | Lee et al. | 455/410 |
| 7,849,321 | B2 * | 12/2010 | Mizrah | 713/182 |
| 7,853,783 | B2 * | 12/2010 | Bin et al. | 713/153 |
| 7,864,987 | B2 * | 1/2011 | Venkatanna et al. | 382/115 |
| 7,953,983 | B2 * | 5/2011 | Holt et al. | 713/186 |
| 8,001,593 | B2 * | 8/2011 | Uno | 726/20 |
| 8,122,259 | B2 * | 2/2012 | Menczel et al. | 713/186 |
| 2004/0073813 | A1 * | 4/2004 | Pinkas et al. | 713/202 |
| 2004/0139331 | A1 * | 7/2004 | Sanai et al. | 713/184 |
| 2004/0219902 | A1 * | 11/2004 | Lee et al. | 455/410 |
| 2004/0225880 | A1 * | 11/2004 | Mizrah | 713/155 |
| 2004/0230843 | A1 * | 11/2004 | Jansen | 713/202 |
| 2004/0250138 | A1 * | 12/2004 | Schneider | 713/202 |
| 2005/0097325 | A1 * | 5/2005 | Morris et al. | 713/170 |
| 2005/0138393 | A1 * | 6/2005 | Challener et al. | 713/186 |
| 2005/0144451 | A1 * | 6/2005 | Voice et al. | 713/170 |
| 2005/0273866 | A1 * | 12/2005 | Brown et al. | 726/28 |
| 2005/0289082 | A1 * | 12/2005 | Morris et al. | 705/65 |
| 2006/0031855 | A1 * | 2/2006 | Smithline | 719/328 |

(Continued)

OTHER PUBLICATIONS

A Preshshner, Model-based testing for real, Nov. 2004, Internation Journal on Software Tools for Technology (STTT), vol. 5, pp. 342-350.*

*Primary Examiner* — Nathan Flynn
*Assistant Examiner* — Viral Lakhia
(74) *Attorney, Agent, or Firm* — P. Su (57) ABSTRACT

Methods and apparatus for authenticating a user are disclosed. According to one aspect of the present invention, a method for authenticating a user includes displaying a first representation of a challenge. The challenge is based on a ruleset. The method also includes receiving a first input, determining if the first input furthers a successful completion of the first representation of the challenge, and determining if the first input completes the first representation of the challenge. If it is determined that the first input completes the first representation of the challenge and that the first input furthers the successful completion of the first representation of the challenge, the method further includes positively augmenting a security indicator.

38 Claims, 8 Drawing Sheets

U.S. PATENT DOCUMENTS

| | | | |
|---|---|---|---|
| 2006/0041759 A1* | 2/2006 | Kaliski et al. | 713/184 |
| 2006/0056664 A1* | 3/2006 | Iwasaki | 382/115 |
| 2006/0112278 A1* | 5/2006 | Cohen et al. | 713/186 |
| 2006/0156385 A1* | 7/2006 | Chiviendacz et al. | 726/2 |
| 2006/0174133 A1* | 8/2006 | Obata | 713/182 |
| 2006/0190624 A1* | 8/2006 | Kegoya et al. | 709/246 |
| 2006/0206717 A1* | 9/2006 | Holt et al. | 713/182 |
| 2006/0225127 A1* | 10/2006 | Roberts et al. | 726/2 |
| 2006/0253706 A1* | 11/2006 | Roberts et al. | 713/168 |
| 2007/0089164 A1* | 4/2007 | Gao et al. | 726/4 |
| 2007/0157309 A1* | 7/2007 | Bin et al. | 726/15 |
| 2008/0184363 A1* | 7/2008 | Narasimhan | 726/18 |
| 2008/0209223 A1* | 8/2008 | Nandy et al. | 713/185 |
| 2008/0281737 A1* | 11/2008 | Fajardo | 705/35 |

* cited by examiner

CHALLENGE-BASED AUTHENTICATION PROTOCOL

BACKGROUND OF THE INVENTION

1. Field of Invention

The present invention relates generally to security measures used to restrict access to resources. More particularly, the present invention relates to an authentication protocol that is based on utilizing challenge-response rules to achieve a relatively high level of security.

2. Description of the Related Art

Authenticating a user prior to allowing the user to access the resources of a system allows the resources to be relatively secure, as unauthorized access to the resources may be greatly reduced. Many authentication processes are based on passwords, which are generally static. As passwords are generally static, passwords may be abducted or otherwise obtained. For example, passwords may be sniffed, determined by listening to keystrokes used to enter passwords, or viewed by an individual watching a password owner enter a password. Further, any interaction between a user and an untrusted display or input device may lead to passwords being sniffed or otherwise intercepted, e.g., stolen.

To prevent passwords from being abducted, protocols such as zero knowledge proofs (ZKPs) may be used for authentication. However, such protocols often require complex mathematics, and may be impractical, e.g., when a user does not have access to a trusted augmenting processor that enables calculations of public key exponentiations or discrete logs.

Therefore, what is needed is a method and an apparatus that allows users to be authenticated without requiring passwords or access to a secure computer. That is, what is desired is a system that allows a user to be authenticated in a secure, relatively uncomplicated manner

BRIEF DESCRIPTION OF THE DRAWINGS

The invention may best be understood by reference to the following description taken in conjunction with the accompanying drawings in which.

DESCRIPTION OF THE EXAMPLE EMBODIMENTS

A security protocol that performs an authentication process with a non-augmented human, as for example a user who has no access to a trusted computing device and, hence, utilizes natural computational power or brainpower, may provide a relatively high level of security if the authentication process involves challenges which are based on a shared secret between the security protocol and the non-augmented human. Hence, such a security protocol may use an insecure channel. Further, such a security protocol may be used on a channel that is not computer-controlled, and does not necessarily rely on the availability of computational hardware. In one embodiment, a security protocol provides security at approximately the level of a zero knowledge proof (ZKP) protocol or higher, and involves the implementation of a set of rules that is known to the non-augmented human and to a provider, e.g., the caretaker or maintainer of a resource or information to which the human desires access. As a result, the security protocol provides a relatively high level of security on substantially any communications channel, and does not require that the human possesses significant mathematical knowledge or has access to a computing device.

A set of rules, or a ruleset, is generally associated with a secret that is shared between a human and a provider, or a system associated with a provider. The ruleset may include rules of a game that is effectively played between the human and the provider. Knowledge of a particular image may also be considered to be a ruleset, as the human and the provider may both be aware of what the image is supposed to look like and, therefore, may both be capable of identifying errors in the image. Hence, a ruleset is substantially any set of rules, e.g., rules associated with a game or an image, that are known to a human and to a provider.

In addition to sharing knowledge of a ruleset, a human and a provider typically also share a context. A context may be associated with color or symbol mappings, a protocol associated with correct or incorrect entries, and substantially any other information that is specific to a ruleset. By way of example, a context for a game may include the color associated with entries made by a human, the protocol associated with moves made by the human that may be considered to be correct moves.

A game challenge may be played between a human and a provider on a lattice, e.g., a numerical keypad or an image that corresponds to a numerical keypad, to authenticate the user. The game being played during a game challenge may not typically be identified from watching or recording moves made by the user. It would be highly unlikely that an observer or a dishonest user could successfully complete an authentication process without knowledge of the ruleset for the game, even if moves made during a successful authentication process are known. Typically, the initial state of the game challenge may be randomized, e.g., a starting game board of the game challenge may vary each time an authentication process is initiated.

One example of a ruleset may be an image match challenge. As the human and the provider share knowledge of what a verification image is supposed to look like, the human may be able to identify any errors in a representation of the verification image. If the provider displays a representation of the image on a lattice or image grid of display elements such that at least one element is inaccurate, and displays a different inaccurate element each time a representation of the image is displayed during an authentication process, a third-party observer or a sniffer are unlikely to be able to ascertain what a correct representation of the image would look like. Further, as a dishonest user would have no knowledge of what the verification image is supposed to look like, the dishonest user would be unlikely to be authenticated by the provider even if the dishonest user had recorded or observed a successful authentication process.

By randomizing a game such that a game board is populated in a random manner each time a game challenge is played out, and by randomizing an image such that elements of the image that are erroneously displayed vary each time an image challenge is played out, the security of a system which utilizes a game challenge or an image challenge as a part of an authentication process is enhanced. The number of challenges which a user is expected to successfully complete may vary depending upon a desired level of security. For instance, a larger number of successfully completed challenges may be needed for a higher level of security, while a smaller number of successfully completed challenges may be accepted for a lower level of security. Challenges are relatively easily completed by an honest user, as the challenges allow the user to use knowledge her or she readily possesses. As a result, a security protocol that utilizes challenges that may be completed by a non-augmented human is both effective and efficient.

Figure 1:
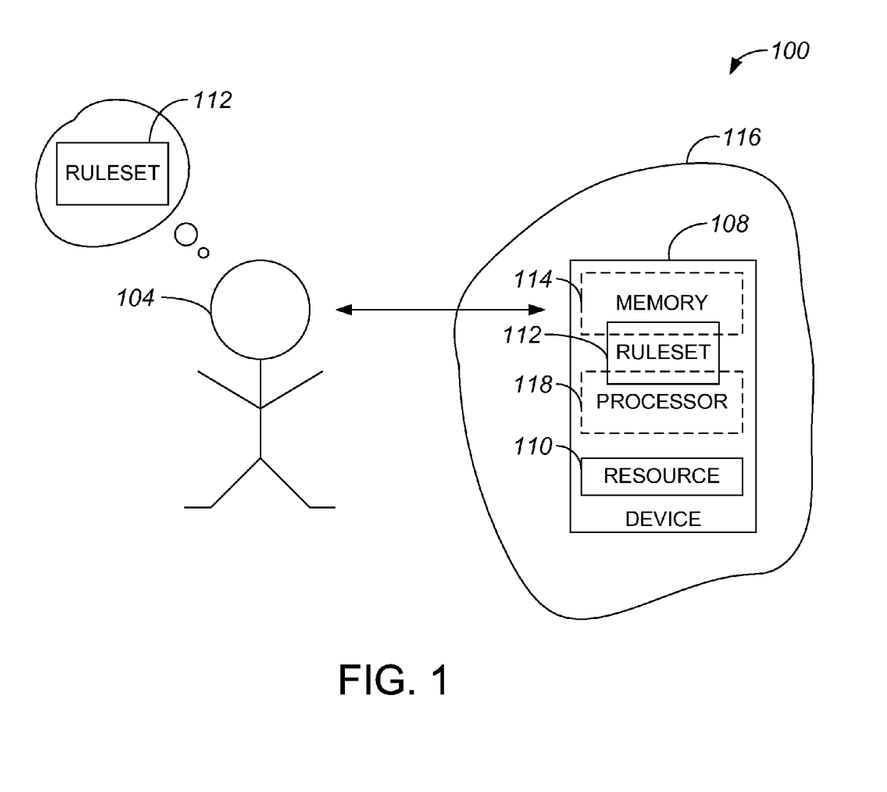
FIG. 1 is a diagrammatic representation of a system in which a non-augmented human and a device share knowledge of a ruleset in accordance with an embodiment of the present invention.

FIG. 1 is a diagrammatic representation of an overall system in which a non-augmented human and a device share knowledge of a set of rules, or a ruleset, in accordance with an embodiment of the present invention. An overall system 100 includes a device 108 that provides security for or otherwise protects a resource 110. Device 108 may be a device that is associated with a provider, e.g., device 108 may be a bank terminal that is owned by a provider that is a bank organization. In one embodiment, device 108 may be a part of an overall network 116, and resource 110 may be located substantially anywhere in network 116 such that device 108 controls access to resource 110. System 100 also includes a user 104, e.g., a non-augmented human, who is capable of interacting with device 108.

User 104 and device 108 share knowledge of a ruleset 112. Ruleset 112 may be implemented in device 108, i.e., logic that implements ruleset 112 may be implemented within device 108. In one embodiment, software or software logic that implements ruleset 112 may be stored in a memory 114 or other tangible media, and executed by a processor 118. It should be appreciated that ruleset 112 may also be implemented within device 110 as hardware or as hardware logic. With respect to user 104, ruleset 112 may be maintained as knowledge within user 104.

Ruleset 112 may include rules for a game that user 104 and device 108 may interact to play, or a set of rules associated with an image that device 108 may display to user 104. Device 108 may display a game board on a display (not shown) or a physical keyboard (not shown), and user 104 may interact with the game board to play a game, or otherwise engage in a game challenge. In general, a display of a game board and an input device (not shown) may be separate, e.g., a display may be a television screen and an input device may be a remote control, although it should be appreciated that a display and an input device may be encompassed as a substantially single entity. Ruleset 112 may include rules for substantially any game. By way of example, ruleset 112 may include rules for a tic-tac-toe game or an image match challenge.

In a tic-tac-toe game, each player is assigned to a mark, e.g., user 104 may be assigned the mark "O" while device 108 may be assigned to a mark "X". Players alternate turns by placing an assigned mark on a square of a three-by-three game board until either one of the players has three of his or her assigned marks in a row, or all nine squares on the game board are marked. If all nine squares on the game board are marked, but neither player has three assigned marks in a row, neither player wins the game.

Figure 2A:
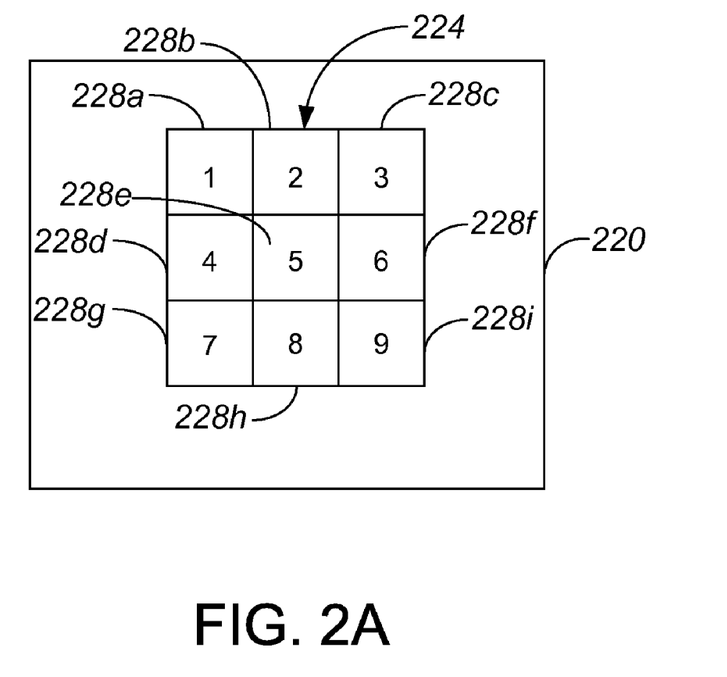
FIG. 2A is a block diagram representation of a keypad displayed on a display in accordance with an embodiment of the present invention.

Referring next to FIG. 2A, a display of a three-by-three lattice of elements such as a keypad that is suitable for displaying a tic-tac-toe game will be described in accordance with an embodiment of the present invention. A keypad 224, which may be displayed on a display 220 that is associated with a computing device (not shown) or a terminal (not shown) that accepts user input, includes keys 228a-i. Keys 228a-i may be considered to be lattice or display elements.

Figure 2B:
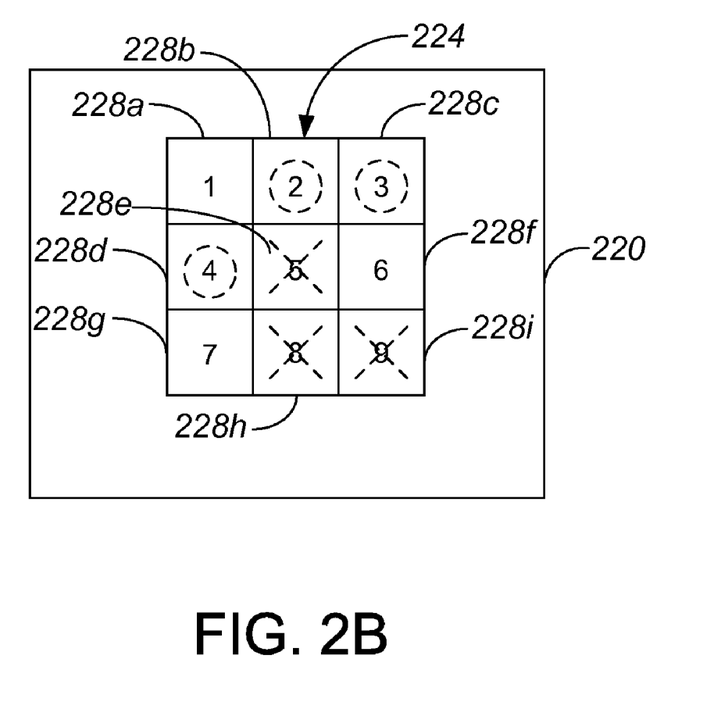
FIG. 2B is a block diagram representation of a displayed keypad, i.e., displayed keypad 224 of FIG. 2A, on which a game challenge based on a tic-tac-toe ruleset is implemented in accordance with an embodiment of the present invention.

Keys 228a-i may be indicated on display 220 as being marked by colors and/or markings. As shown in FIG. 2B, if a tic-tac-toe ruleset is used to for an authentication process, "O" marks may indicate moves of a user and "X" mark may indicate moves of a provider that performs the authentication process. The provider may consider a game challenge associated with keyboard 224 to be completed if a user successfully completes the game displayed thereon. It should be appreciated that keyboard 224 may be prepopulated such that a user need only make a single move to secure a victory or a loss. Alternatively, keyboard 224 may be relatively unpopulated such that a user and a provider may interact, with the provider making moves to further the likelihood that the outcome of the game is favorable to the user.

Depending upon the specifications provided by the provider, a successful completion of the game may either be a victory by the user or a loss by the user. On keypad 224 as shown, if a user is attempting to win the game and selects key 228a, and effectively changes the available state of key 228a to a state associated with an "O" mark, the game challenge may be considered to be successfully completed, as the user will then have three "O" marks in a row on keys 228a-c. However, if the user selects key 228f, the user will then have unsuccessfully completed the game, as the provider would win by marking an "X" on either key 228a or key 228g. The selection of keys 228a-i by a user may occur through interaction with a graphical user interface (not shown) associated with display 220. It should be appreciated that selecting a key 228a-i may involve changing a state of the selected key 228a-i.

Although marks are represented as "O" marks and "X" marks, marks may be represented by substantially any suitable alphanumeric or graphic characters. Further, marks may be represented by colors. By way of example, if display 220 is a color display, "O" marks may instead be one color while "X" marks are another color.

Figure 3A:
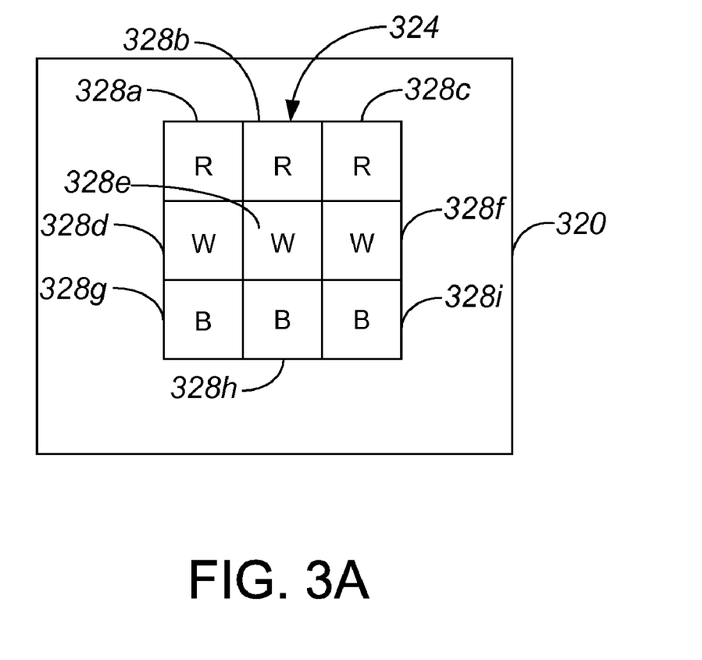
FIG. 3A is a block diagram representation of a lattice or an image grid displayed on a display in accordance with an embodiment of the present invention.

As previously mentioned, instead of being based on a ruleset for a game challenge, an authentication process may instead be based on a ruleset for an image challenge or an image match challenge. FIG. 3A is a block diagram representation of an image displayed on a lattice or an image grid of a display in accordance with an embodiment of the present invention. A lattice 324 that is displayed on a display 320 includes a plurality of elements 328a-i. Although elements 328a-i are displayed in lattice 324 as a three-by-three array, e.g., as a keypad representation, it should be appreciated that elements 328a-i may be organized in a variety of different manners. Further, the number of elements 328a-i may vary widely, i.e., the number of elements 328a-i may be fewer than or more than nine.

A verification image is effectively displayed on lattice 324. The verification image is such that elements 328a-c are displayed as having a red (R) color, elements 328d-f are displayed as having a white (W) color, and elements 328g-i are displayed as having a blue (B) color. This verification image may be established as a shared secret between a provider, or an implementer of display 320, and a user.

Figure 3B:
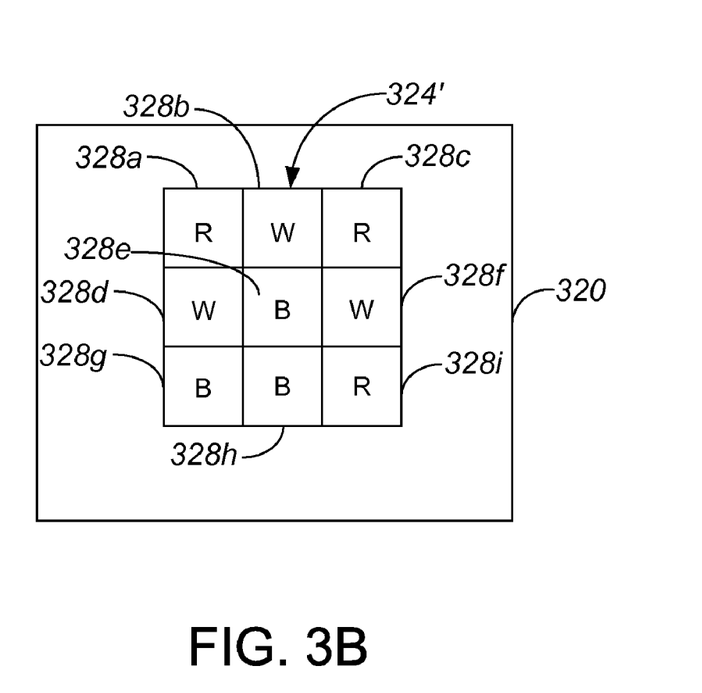
FIG. 3B is a block diagram representation of a modified version of a lattice, i.e., lattice 324 of FIG. 3A, on which elements of an image are incorrectly displayed during an image challenge in accordance with an embodiment of the present invention.

To authenticate a user, the verification image may be displayed incorrectly, and the user may be expected to effectively determine which elements of the verification image are incorrectly displayed, and which elements of the verification image are correctly displayed. FIG. 3B is a block diagram of a representation of a verification image displayed on a lattice, i.e., lattice 324 of FIG. 3A, on which elements of an image are incorrectly displayed during an image challenge in accordance with an embodiment of the present invention. Lattice 324' provides a representation of the verification image of FIG. 3A, and misrepresents some elements of the verification image. In the embodiment as shown, element 328b which is red (R) in the verification image is represented as being white (W), element 328e which is white (W) in the verification image is represented as being blue (B), and element 328i which is blue (B) in the verification image is represented as being red (R).

A provider, or the implementer of an authentication process that involves lattice 324', may request that a user identifies incorrectly displayed elements 328a-i. As a result, an image challenge involving the representation of the verification image displayed on lattice 324' will not be considered to be successfully completed unless at least one of elements 328b, 328e, or 328i is indicated by the user as being incorrect. The user may be expected to identify one or more of elements 328b, 328e, 328i, depending upon the requirements of a particular challenge. Alternatively, a provider may request that a user identifies any or all correctly displayed elements 328a, 328c, 328d, 328f-h in order for the image challenge to be considered to be successfully completed. In one embodiment, a single selection of a single element 328a-i may indicate the completion of an image challenge.

Figure 4:
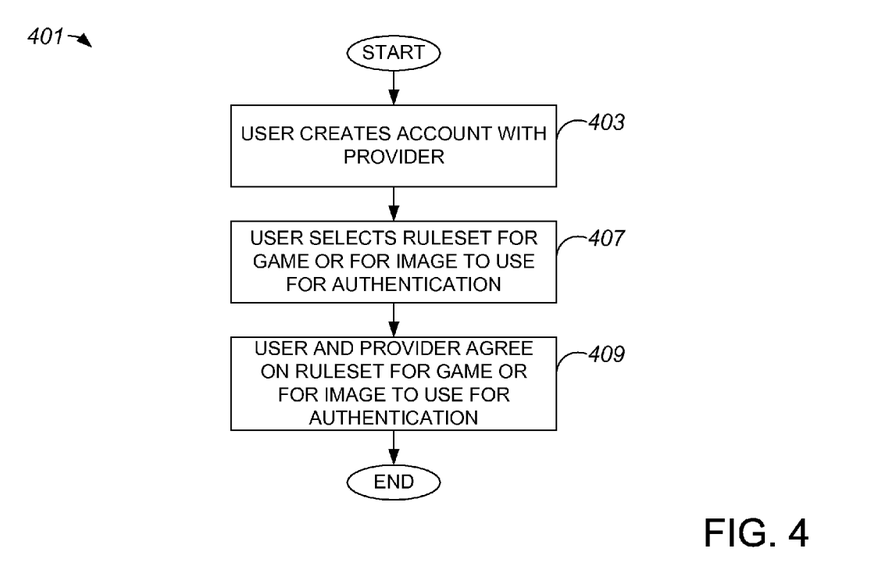
FIG. 4 is a process flow diagram which illustrates one method of establishing a ruleset for a game or for a verification image in accordance with an embodiment of the present invention.

FIG. 4 is a process flow diagram which illustrates one method of establishing a ruleset for a game or for a verification image in accordance with an embodiment of the present invention. A process of establishing a ruleset for a game or for a verification image 401 begins at step 403 in which a user, e.g., a non-augmented human, creates an account with a provider. The provider may generally be an owner or a caretaker of a resource to which the user desires access. By way of example, a provider may be a bank and a resource may be a bank account held by the user, or a provider may be an internet service provider and a resource may be internet service.

Once an account is created, the user may select a ruleset for a game or for a verification image to use for authentication purposes in step 407. The user may select a ruleset for a game he or she may effectively play with the provider as a part of an authentication process, or the user may select an image that the provider is to modify as a part of an authentication process. The provider may provide a list of rulesets and images that the user may choose. In one embodiment, the provider may allow a user to create an image. After the user selects a ruleset for a game or an image, the user and the provider agree on the ruleset for the game or the image to use for authentication purposes in step 409, and the process of establishing a ruleset for a game or for a verification image is completed.

Figure 5A:
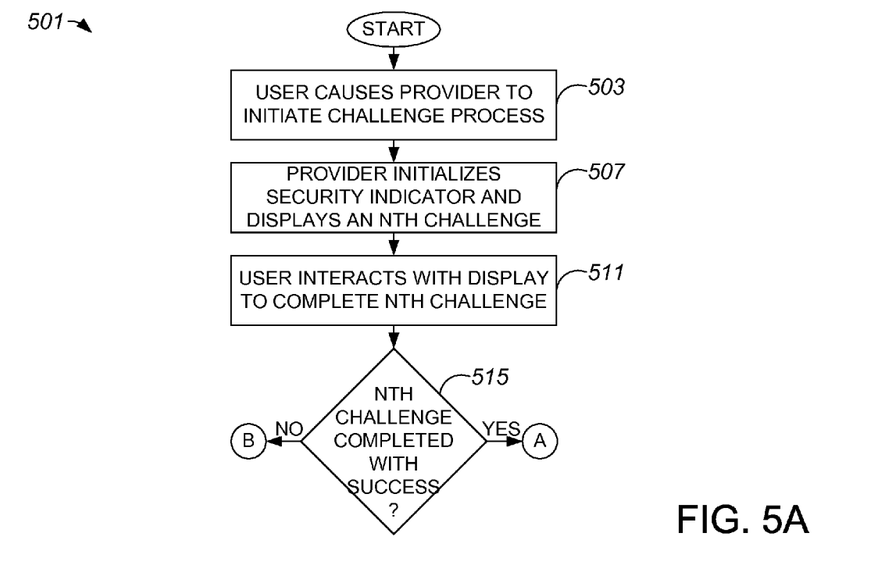
FIGS. 5A-5C are a process flow diagram which illustrates one method of authenticating a non-augmented human in accordance with an embodiment of the present invention.
Figure 5B:
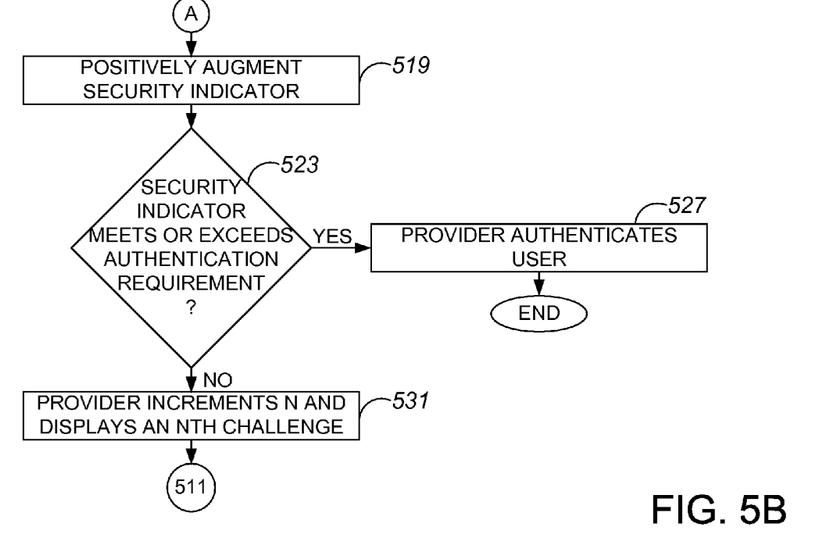
Figure 5C:
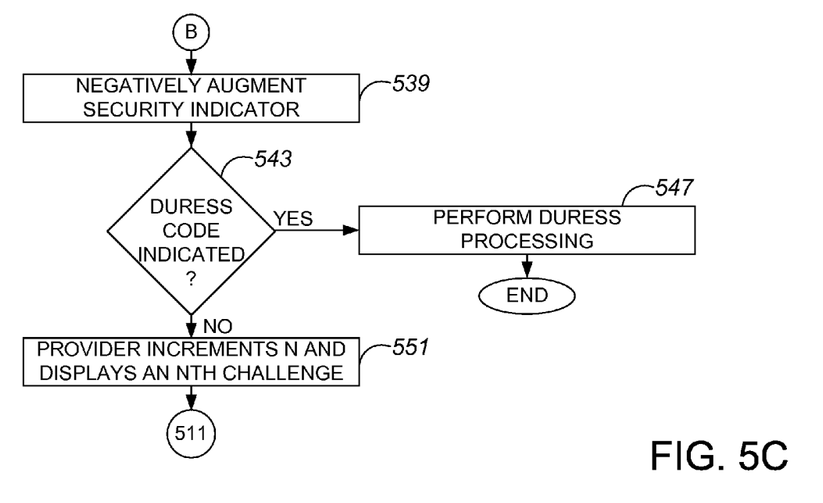

Using a ruleset for a game or for a verification image, a provider may challenge or effectively test a user to determine if the user is honest or authentic. With reference to FIGS. 5A-5C, one process of authenticating a user will be described in accordance with an embodiment of the present invention. A process 501 of authenticating a user begins at step 503 in which a user causes a provider to initiate a challenge process. The user may cause a challenge process to be initiated by identifying himself or herself and requesting access to a resource. The identification of the user may be achieved when a device acting on behalf of or controlled by a provider receives an input identification string from the user, e.g., when the user inputs the string using a computer or when a cardreader reads an identification card owned by the user.

After the user causes a provider to initiate a challenge process, the provider initializes a security indicator in step 507, and also display a first challenge or, more generally, an Nth challenge where N is initialized to a value of one. Initializing a security indicator may include determining how many security bits are to be obtained by the user before authentication is considered to be successful. The number of security bits may vary based upon the location of the user. For example, if the user is attempting to access a resource protected by the provider from a virtual private network (VPN) of the provider, fewer security bits may be needed than would be needed if the user is attempting to access the resource from an unknown system.

From step 507, process flow moves to step 511 in which the user interacts with the display of the Nth challenge to complete the Nth challenge. Interacting with the display may include making moves in a game challenge, or selecting image elements in an image challenge. Methods of interacting with a display will be described in more detail below with respect to FIGS. 6 and 7.

A determination is made in step 515 as to whether the Nth challenge has been successfully completed. Such a determination may be made after a particular amount of time has elapsed, after a predetermined number of keystrokes has been recorded by a system that includes the display, or after there are no more moves left to make in a game. If it is determined that the Nth challenge has been successfully completed, a security indicator is positively augmented in step 519. Positively augmenting a security indicator generally involves increasing the value of the security indicator and may include, in one embodiment, incrementing a security indicator.

Once the security indicator is positively augmented, it is determined in step 523 if the security indicator meets or exceeds an authentication requirement. The authentication requirement may be a number of security bits that are to be accumulated before the user is authenticated. As previously mentioned, the number of security bits may vary. If it is determined that the security indicator meets or exceeds the authentication requirement, the provider authenticates the user in step 527. After the user is authenticated, the user may be granted access to a resource that is maintained or controlled by the provider, and the process of authenticating the user is completed.

Alternatively, if the security indicator is determined in step 523 not to meet or exceed the authentication requirement, the indication is that more challenges are to be presented to the user. As such, in step 531, the provider increments N, and displays an Nth challenge to the user. Process flow then returns to step 511 in which the user interacts with the display to complete the Nth challenge.

Returning to step 515, if the Nth challenge is determined not to have been successfully completed, the security indicator is negatively augmented in step 529. Negatively augmenting generally involves reducing the value of the security indicator, and may include, but is not limited to, dividing the security indicator by a factor and decrementing the security indicator. In one embodiment, the factor by which the security indicator may be divided is approximately two.

A determination is made in step 543 regarding whether a duress code is indicated. As will be appreciated by those skilled in the art, a duress code is generally a code that may be entered by a user in indicate that he or she is under duress. In the described embodiment, a duress code may be indicated by a user if the user responds to a series of challenges with only incorrect responses or unsuccessfully completed challenges. If a certain number of consecutive unsuccessfully completed challenges are effectively recorded, e.g., by the provider or a device controlled by the provider, a duress code may be indicated.

It the determination in step 543 is that a duress code is indicated, duress processing is performed in step 547. The duress processing, which may be performed by a device controlled by the provider, may involve freezing access to a resource or halting a challenge process. In some situations, e.g., when a duress code is indicated at an automatic teller machine, duress processing may include altering authorities to a potential crime. After the duress processing is performed, the process of authenticating a user is terminated.

Alternatively, of no duress code is indicated in step 543, then process flow moves to step 551 in which the provide increments N and displays an Nth challenge. Once the Nth challenge is displayed, process flow returns to step 511 in which the user interacts with the display to complete the Nth challenge.

Figure 6:
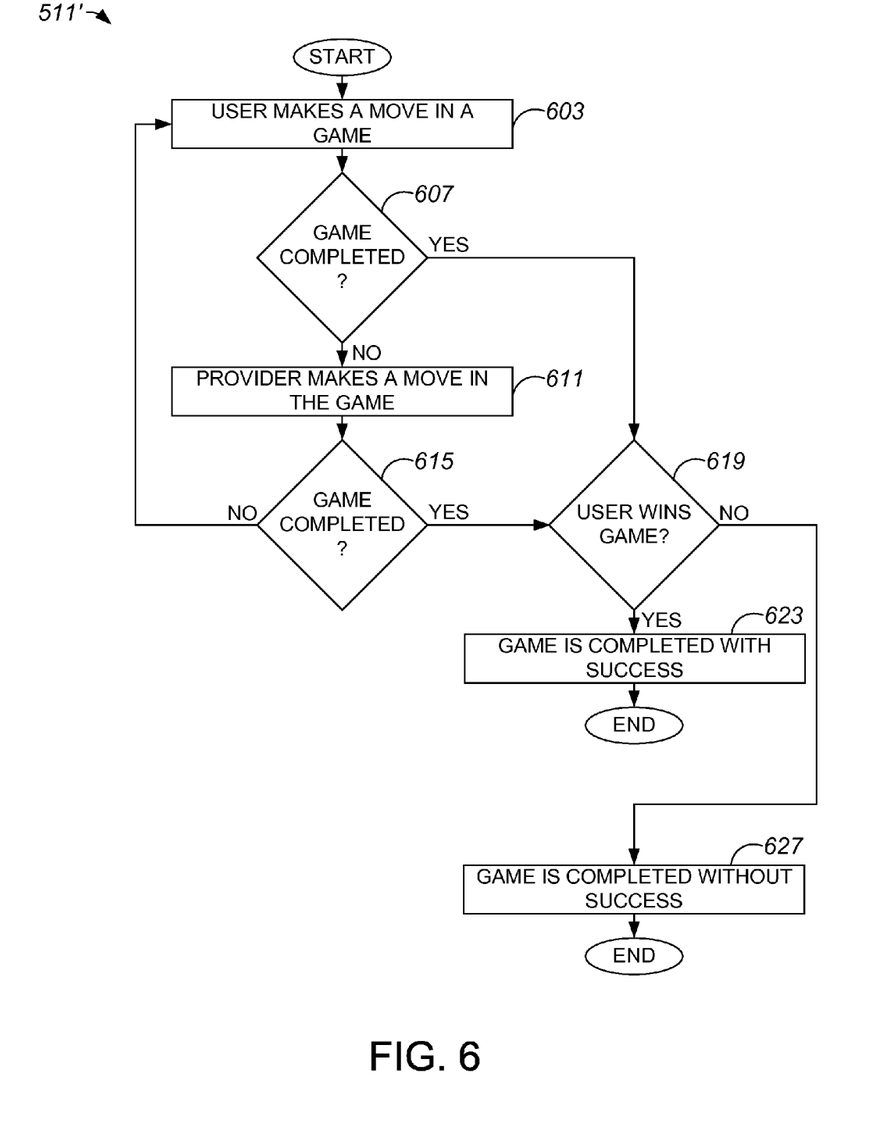
FIG. 6 is a process flow diagram which illustrates one method of interacting with a display to complete a challenge, e.g., step 511 of FIG. 5A, that is based on a game in accordance with an embodiment of the present invention.

As mentioned above, the methods associated with a user interacting with a display to complete a challenge may vary. By way of example, methods associated with a challenge that is a game may vary from methods associated with a challenge that is an image. FIG. 6 is a process flow diagram which illustrates one method of interacting with a display to complete a challenge, e.g., step 511 of FIG. 5A, that is based on a game in accordance with an embodiment of the present invention. A process 511' of interacting with a display to complete a game challenge begins at step 603 in which a user makes a move in a game. In one embodiment, if the game is tic-tac-toe and the user plays "X" or a color to correlates to "X," the user may make a move by indicating an "X" in an empty position on a tic-tac-toe board.

A determination is made in step 607 regarding whether the game is completed. If it is determined that the game is not completed, the indication is that the user has not won the game and that there are additional moves that may be made. The provider then makes a move in the game in step 611. The provider may make a move by causing the display of the game is updated to include a new provider move, e.g., to include a new "O" in a tic-tac-toe game. After the provider makes a move, a determination is made in step 615 as to whether the game is completed. If the game is determined not completed, the implication is that the move made by the provider has not caused the provider to win the game, and that there are additional moves which may be made in the game. Accordingly, process flow returns to step 603 in which the user makes a move in the game.

Alternatively, if it is determined in step 615 that the game is completed, it is determined in step 619 if the user has won the game. If it is determined that the user has won the game, the game is considered to be completed successfully in step 623, and the process of interacting with a display to complete a game challenge is completed. On the other hand, if it is determined that the user has not won the game, the game is considered to be completed unsuccessfully in step 627, and the process of interacting with a display to complete a game challenge is completed.

Returning to step 607, if it is determined that the game has been completed, the indication is that either the user has won the game, or that there are no more moves to be made in the game. In one embodiment, the indication may also be that while there may be additional moves to make in the game, there are no moves which would result in the user winning the game. As such, process flow proceeds to step 619 in which it is determined if the user has won the game.

Figure 7:
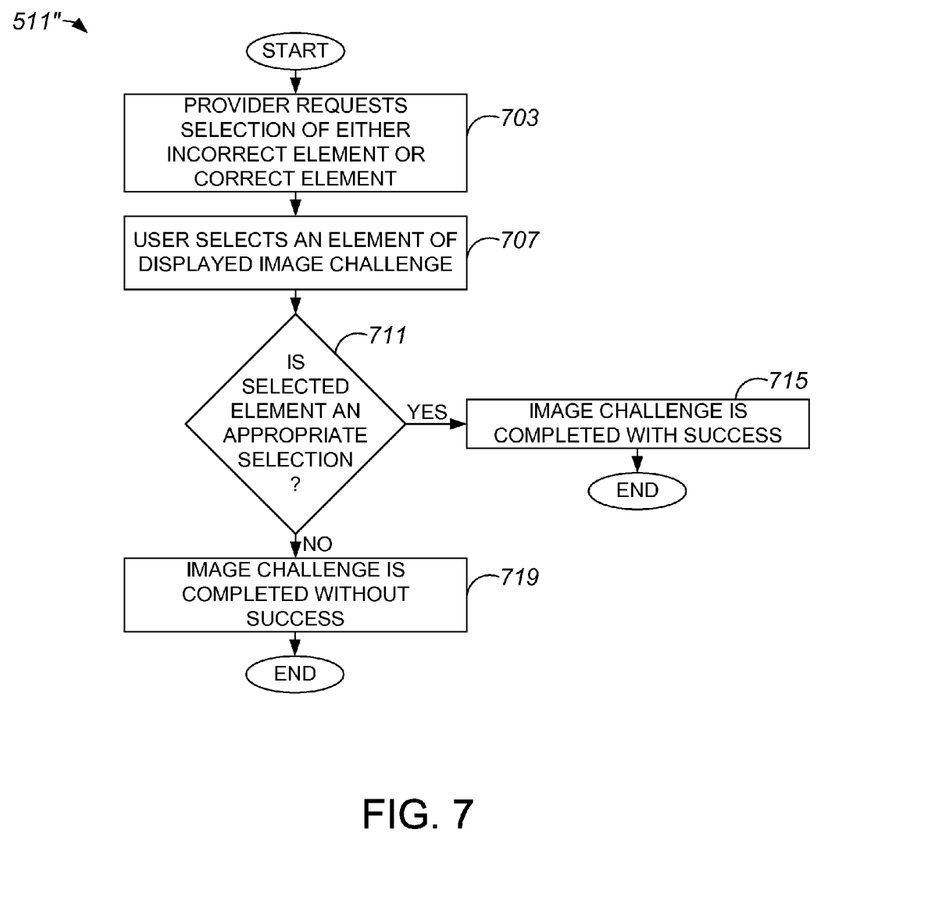
FIG. 7 is a process flow diagram which illustrates one method of interacting with a display to complete a challenge, e.g., step 511 of FIG. 5A, that is based on a verification image in accordance with an embodiment of the present invention.

With reference to FIG. 7, a method of interacting with a display to complete a challenge, e.g., step 511 of FIG. 5A, that is based on a verification image will be described in accordance with an embodiment of the present invention. A process 511" of completing an image challenge begins at step 703 in which the provider either requests, e.g., using a display, that a user identifies an incorrect element displayed in a representation of a verification image or requests that the user identifies a correct element displayed in the representation. That is, the provider either instructs a user to identify an incorrectly displayed element or instructs the user to identify a correctly displayed element in a representation of a verification image. The determination of whether to instruct the user to identify an incorrectly displayed element or to instruct the user to identify a correctly displayed element may be based upon a preference selected by the user at the time the verification image was chosen, e.g., when an account with the provider was established by the user.

In step 707, the user selects an element of the displayed representation of the verification image, i.e., the user selects an element displayed in an image challenge. The element selected by the user may be a pixel, or a plurality of pixels. After the user selects an element, it is determined in step 711 if the selected element is an appropriate selection. If the user is expected to select an incorrect element, an appropriate selection would be an incorrect element. Alternatively, if the user is expected to select a correct element, an appropriate selection would be a correct element.

If it is determined that the selected element is an appropriate selection, the image challenge is considered to be completed with success in step 715. On the other hand, if the selected element is determined not to be an appropriate selection, the image challenge is considered to be completed without success in step 719.

Figure 8:
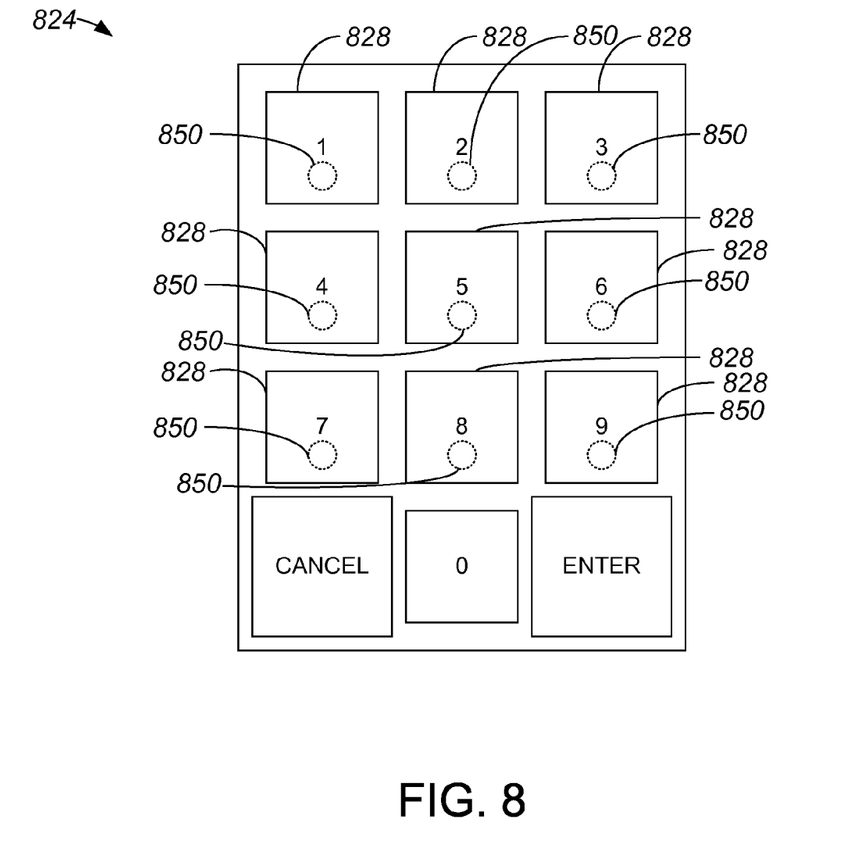
FIG. 8 is a block diagram representation of a keypad which includes light emitting diodes (LEDs) that provide an array of colors in accordance with an embodiment of the present invention.

When a game or an image is displayed on a keypad that is imposed on a display screen, a user may make a move or select an element, respectively, by physically interacting with the keypad that is imposed on the display or with a physical keypad, e.g., a keypad with keys or buttons to be pressed. In one embodiment, a game or an image may effectively be displayed on a physical keypad. A physical keypad which may display a game or an image may be arranged to include light emitting diodes (LEDs) that provide different colors of light. FIG. 8 is a block diagram representation of a physical keypad which includes LED arrangements that are capable of providing an array of colors in accordance with an embodiment of the present invention. A keypad 824 includes keys 828. Each key 828 has an associated LED arrangement 850. LED arrangements 850 may be arranged substantially underneath keys 828 such that LED arrangements 850 provide back lighting to keys 828. Alternatively, keys 828 may either be transparent or have openings therethrough which enable LED arrangements 850 positioned substantially underneath keys 828 to be viewed.

In the described embodiment, LED arrangements 850 each include a red LED, a green LED, and a blue LED. It should be understood, however, that LED arrangements 850 may include fewer than or more than three LEDs. The number of LEDs included in each LED arrangement 850 may vary depending upon the number of colors needed for a game or an image. As LED arrangements 850 each include a red LED, a green LED, and a blue LED, LED arrangements 850 may provide up to approximately five colors, or display elements. The five colors are red, green, blue, white, and black. To increase the number of colors and, hence the number of different rulesets for games or for images that may be created, the number of LEDs in each LED arrangement 850 may be increased.

Although only a few embodiments of the present invention have been described, it should be understood that the present invention may be embodied in many other specific forms without departing from the spirit or the scope of the present invention. By way of example, while the present invention has generally been described as being implemented with display elements of color, the present invention may be implemented on a display with other display elements such as alphanumeric or graphic elements. For an alphanumeric implementation of the present invention, a display of characters may effectively be a verification image. A representation of such a verification image may include incorrect characters, and a user may be challenged to identify an incorrect character.

In general, a device controlled by a provider, e.g., a computing device, may randomly determine which elements of a representation of an image to display incorrectly. This randomization provides security, as the keystrokes or actions undertaken by a user would typically not be the same for different authentication processes. Hence, an observer or a sniffer would likely not be able to make sense of the actions taken by a user. To further increase randomization for an image challenge, whether the user is requested to select an incorrect image element or a correct image element may also be randomized. By way of example, if a certain element in a representation of a verification image is one color, the indication may be that the user is to select an incorrect image element, and if that element is of a different color, the indication may be that the user is to select a correct image element.

Different types of challenges may be incorporated into a single authentication process. For example, a single authentication process may alternate between a game challenge and an image challenge. Alternatively, a single authentication process may involve representations of one game challenge, but may effectively oscillate between having the user try to win the game challenge and having the user try to lose the game challenge. Similarly, a single authentication process may include representation of one image challenge, but may alternate between having the user try to select an incorrect image element and having the user try to select a correct image element.

A game challenge may include a game that may be completed when a user makes a single move, or a game that may be completed only after the user and a provider make a plurality of moves. For instance, for a tic-tac-toe ruleset, a game may be such that with a single move, the user may win the game. Alternatively, a game may be such that the user needs two or more moves to win the game. Typically, in a game in which the user needs two or more moves to win the game, the provider may facilitate the ability for the user to win the game, i.e., the provider may make moves that prevent the provider from winning the game.

While a game challenge has been described as utilizing a tic-tac-toe ruleset, a game challenge is not limited to utilizing a tic-tac-toe ruleset. A ruleset that is used for a game challenge may be associated with a variety of games including, but no limited to, Minesweeper, Go, Pente, Othello, Boxes, Memory, Nim, Check-Mate, Knight's Travel, Same Game, and Peg-Solitaire.

A security indicator, which may be a counter that provides an indication of the success of a user with regards to a challenge process, has been described as being positively augmented in response to a successful completion of a challenge and as being negatively augmented in response to an unsuccessful completion of a challenge. It should be appreciated, however, that a security indicator may be arranged augmented to a variety of different ways to indicate whether a given challenge has been successfully completed or unsuccessfully completed.

In one embodiment, a security indicator may be a percentage rather than a counter. That is, a security indicator may be arranged to reflect a percentage of successful challenges that are completed by a user. If a security indicator reflects a percentage, then an authentication requirement may be a particular percentage of successful challenges.

LEDs have been described as providing light of different colors. LEDs, however, are just one example of a light source that provides light of different colors. In other words, light provided to a keypad which has keys that are either lighted or backlighted may come from a variety of different sources.

The steps associated with the methods of the present invention may vary widely. Steps may be added, removed, altered, combined, and reordered without departing from the spirit of the scope of the present invention. By way of example, a process of authenticating a user may include steps associated with aborting an authentication process. In one embodiment, an authentication process may be aborted if a user fails to accrue a particular percentage of successfully completed challenges within a given time frame, or if a security indicator does not reach a particular value within a given time frame. Therefore, the present examples are to be considered as illustrative and not restrictive, and the invention is not to be limited to the details given herein, but may be modified within the scope of the appended claims.

What is claimed is:

1. A computer-implemented method for authenticating a user, the method comprising:

displaying a first representation of a pattern on a display associated with a computing device, the pattern including a plurality of elements, the plurality of elements including a first element having a first state and a second element having a second state, wherein the first representation includes a first element representation and a second element representation, the first element representation being arranged to incorrectly represent the first element as not having a first state, the second element representation being arranged to correctly represent the second element as having the second state;

receiving a first input on a lattice associated with the computing device, the first input being arranged to identify either the first element representation or the second element representation; and augmenting a security indicator based on the first input, wherein the security indicator has a value and is arranged to indicate whether the user is authenticated, and wherein the user is authenticated when the value meets or exceeds a variable threshold.

2. A computer-implemented method for authenticating a user, the method comprising:

displaying a first representation of a pattern on a display associated with a computing device, the pattern including a plurality of elements, the plurality of elements including a first element having a first state and a second element having a second state, wherein the first representation includes a first element representation and a second element representation, the first element representation being arranged to incorrectly represent the first element as not having a first state, the second element representation being arranged to correctly represent the second element as having the second state;

receiving a first input on a lattice associated with the computing device, the first input being arranged to identify either the first element representation or the second element representation;

determining if the first input identifies the first element representation as representing the first element as not having the first state; and positively augmenting a security indicator based on the first input if it is determined that the first input identifies the first element representation as representing the first element as not having the first state.

3. A computer-implemented method for authenticating a user, the method comprising:

displaying a first representation of a pattern on a display associated with a computing device, the pattern including a plurality of elements, the plurality of elements including a first element having a first state and a second element having a second state, wherein the first representation includes a first element representation and a second element representation, the first element representation being arranged to incorrectly represent the first element as not having a first state, the second element representation being arranged to correctly represent the second element as having the second state;

receiving a first input on a lattice associated with the computing device, the first input being arranged to identify either the first element representation or the second element representation;

determining if the first input identifies the second element representation as representing the second element as having the second state; and positively augmenting a security indicator based on the first input if it is determined that the first input identifies the second element representation as representing the second element as having the second state.

4. The method of claim 1 further including:

determining if the security indicator meets or exceeds the variable threshold; and identifying the user as authenticated if it is determined that the security indicator meets or exceeds the variable threshold.

5. The method of claim 4 further including:

displaying a second representation of the pattern if it is determined that the security indicator does not exceed the variable threshold.

6. The method of claim 1 further including:

identifying the user; and identifying the pattern as being associated with the user.

7. An apparatus for authenticating a user, the apparatus comprising:

means for displaying a first representation of a pattern, the pattern including a plurality of elements, the plurality of elements including a first element having a first state and a second element having a second state, wherein the first representation includes a first element representation and a second element representation, the first element representation being arranged to incorrectly represent the first element as not having a first state, the second element representation being arranged to correctly represent the second element as having the second state;

means for receiving a first input, the first input being arranged to identify either the first element representation or the second element representation; and means for augmenting a security indicator based on the first input, wherein the security indicator has a value and is arranged to indicate whether the user is authenticated, and wherein the user is authenticated when the value meets or exceeds a variable threshold.

8. An apparatus comprising:

logic embodied in one or more physical media operable to cause a first representation of a pattern to be displayed, the pattern including a plurality of elements, the plurality of elements including a first element having a first state and a second element having a second state, wherein the first representation includes a first element representation and a second element representation, the first element representation being arranged to incorrectly represent the first element as not having a first state, the second element representation being arranged to correctly represent the second element as having the second state;

logic embodied in the one or more physical media operable to cause a first input to be received, the first input being arranged to identify either the first element representation or the second element representation;

logic embodied in the one or more physical media operable to cause a security indicator to be augmented based on the first input, wherein the security indicator has a value and is arranged to indicate whether an authentication is successful, and wherein the user is authenticated when the value meets or exceeds a variable threshold; and a processor configured to execute the logic embodied in the one or more physical media.

9. An apparatus:

logic embodied in one or more physical media operable to cause a first representation of a pattern to be displayed, the pattern including a plurality of elements, the plurality of elements including a first element having a first state and a second element having a second state, wherein the first representation includes a first element representation and a second element representation, the first element representation being arranged to incorrectly represent the first element as not having a first state, the second element representation being arranged to correctly represent the second element as having the second state;

logic embodied in the one or more physical media operable to cause a first input to be received, the first input being arranged to identify either the first element representation or the second element representation;

logic embodied in the one or more physical media operable to cause a security indicator to be augmented based on the first input;

logic embodied in the one or more physical media operable to cause a determination if the first input identifies the first element representation as representing the first element as not having the first state;

logic embodied in the one or more physical media operable to cause the security indicator to be positively augmented if it is determined that the first input identifies the first element representation as representing the first element as not having the first state; and a processor configured to execute the logic embodied in the one or more physical media.

10. The apparatus of claim 9 further including logic embodied in the one or more physical media operable to cause the security indicator to be negatively augmented if it is determined that the first input does not identify the first element representation as representing the first element as not having the first state.

11. An apparatus comprising:

logic embodied in one or more physical media operable to cause a first representation of a pattern to be displayed, the pattern including a plurality of elements, the plurality of elements including a first element having a first state and a second element having a second state, wherein the first representation includes a first element representation and a second element representation, the first element representation being arranged to incorrectly represent the first element as not having a first state, the second element representation being arranged to correctly represent the second element as having the second state;

logic embodied in the one or more physical media operable to cause a first input to be received, the first input being arranged to identify either the first element representation or the second element representation;

logic embodied in the one or more physical media operable to cause a security indicator to be augmented based on the first input;

logic embodied in the one or more physical media operable to cause a determination if the first input identifies the second element representation as representing the second element as having the second state;

logic embodied in the one or more physical media operable to cause the security indicator to be positively augmented if it is determined that the first input identifies the second element representation as representing the second element as having the second state; and a processor configured to execute the logic embodied in the one or more physical media.

12. The apparatus of claim 11 further including logic embodied in the one or more physical media operable to cause the security indicator to be negatively augmented if it is determined that the first input does not identify the second element representation as representing the second element as having the second state.

13. The apparatus of claim 8 further including:

logic embodied in the one or more physical media operable to cause a determination if the security indicator meets or exceeds the variable threshold; and logic embodied in the one or more physical media operable to cause the user to be identified as authenticated if it is determined that the security indicator meets or exceeds the variable threshold.

14. The apparatus of claim 13 further including:

logic embodied in the one or more physical media operable to cause a second representation of the pattern to be displayed if it is determined that the security indicator does not exceed the variable threshold.

15. The apparatus of claim 8 further including:

logic embodied in the one or more physical media operable to cause the user to be identified; and logic embodied in the one or more physical media operable to cause the pattern to be identified as being associated with the user.

16. The apparatus of claim 8 further including:

a display, the display being arranged to display the pattern.

17. The apparatus of claim 16 further including:

a keypad arrangement, the keypad arrangement being arranged to receive the first input.

18. A computer-implemented method for authenticating a user, the method comprising:

displaying a first representation of a challenge on a display associated with a computing device, the challenge being based on a ruleset;

receiving a first input on a lattice associated with the computing device;

determining if the first input furthers a successful completion of the first representation of the challenge;

determining if the first input completes the first representation of the challenge;

positively augmenting a security indicator if it is determined that the first input completes the first representation of the challenge;

positively augmenting the security indicator if it is determined that the first input furthers the successful completion of the first representation of the challenge; and determining whether the first input indicates a duress code when it is determined that the first input does not further the successful completion of the first representation of the challenge.

19. The method of claim 18 wherein the ruleset is arranged to specify rules associated with a game.

20. The method of claim 19 wherein the successful completion of the first representation of the challenge is a win credited to the user, the first input being received from the user.

21. The method of claim 18 further including:

determining if the security indicator meets or exceeds a threshold; and identifying the user as authenticated if the security indicator meets or exceeds the threshold.

22. The method of claim 18 further including:

negatively augmenting the security indicator if it is determined that the first input completes the first representation of the challenge and it is determined that the first input does not further the successful completion of the first representation of the challenge; and displaying a second representation associated with the challenge.

23. The method of claim 18 wherein the first representation associated with the challenge is displayed on a lattice, the lattice having a plurality of elements, the plurality of elements including a first element in a first state, and wherein the first input is arranged to change the first element to a second state.

24. The method of claim 18 further including:

identifying the user; and identifying the ruleset as being associated with the user.

25. An apparatus for authenticating a user, the apparatus comprising:

means for displaying a first representation of a challenge, the challenge being based on a ruleset;

means for receiving a first input;

means for determining if the first input furthers a successful completion of the first representation of the challenge;

means for determining if the first input completes the first representation of the challenge; means for positively augmenting a security indicator if it is determined that the first input completes the first representation of the challenge;

means for positively augmenting the security indicator if it is determined that the first input furthers the successful completion of the first representation of the challenge; and means for determining whether the first input indicates a duress code when it is determined that the first input does not further the successful completion of the first representation of the challenge.

26. An apparatus comprising:

logic embodied in one or more physical media operable to cause a first representation of a challenge to be displayed, the challenge being based on a ruleset;

logic embodied in one or more physical media operable to cause a first determination of whether a first input furthers a successful completion of the first representation of the challenge;

logic embodied in one or more physical media operable to cause a second determination of whether the first input completes the first representation of the challenge;

logic embodied in one or more physical media operable to cause a security indicator to be positively augmented if the first determination is that the first input completes the first representation of the challenge;

logic embodied in one or more physical media operable to cause the security indicator to be positively augmented if the second determination is that the first input furthers the successful completion of the first representation of the challenge; and logic embodied in one or more physical media operable to cause a third determination of whether the first input indicates a duress code when the first determination is that the first input does not further the successful completion of the first representation of the challenge.

27. The apparatus of claim 26 wherein the ruleset is arranged to specify rules associated with a game.

28. The apparatus of claim 27 wherein the successful completion of the first representation of the challenge is a win credited to the user, the first input being received from the user.

29. The apparatus of claim 26 further including:

logic embodied in one or more physical media operable to cause a third determination of whether the security indicator meets or exceeds a threshold; and logic embodied in one or more physical media operable to cause the user to be identified as authenticated if the security indicator meets or exceeds the threshold.

30. The apparatus of claim 26 further including:

logic embodied in one or more physical media operable to cause the security indicator to be negatively augmented if the second determination is that the first input completes the first representation of the challenge and the first determination is that the first input does not further the successful completion of the first representation of the challenge; and logic embodied in one or more physical media operable to cause a second representation associated with the challenge to be displayed.

31. The apparatus of claim 26 further including:

a display arrangement, wherein the logic embodied in the one or more physical media operable to cause the first representation associated with the challenge to be displayed is further operable to cause the first representation associated with the challenge to be displayed on the display arrangement.

32. The apparatus of claim 31 wherein the logic embodied in the one or more physical media operable to cause the first representation associated with the challenge to be displayed is still further operable to cause the first representation associated with the challenge to be displayed on the display arrangement as a lattice, the lattice having a plurality of elements, the plurality of elements including a first element in a first state, and wherein the first input is arranged to change the first element to a second state.

33. The apparatus of claim 32 wherein the lattice is a keypad representation.

34. The apparatus of claim 31 further including:

a keypad arrangement, the keypad arrangement being arranged to receive the first input.

35. The apparatus of claim 31 wherein the display arrangement is further arranged to receive the first input.

36. The apparatus of claim 26 further including:

logic embodied in one or more physical media operable to cause the user to be identified; and logic embodied in one or more physical media operable to cause the ruleset to be identified as being associated with the user.

37. The apparatus of claim 26 wherein the ruleset is arranged to specify an image, and the first representation of the challenge is a first representation of the image.

38. The method of claim 18 wherein when it is determined that the first input indicates the duress code, the method further includes:

performing duress processing, wherein performing duress processing includes terminating the challenge.

* * * * *